Feb. 17, 1942.   L. A. MACKLANBURG   2,273,279
WINDOW SASH ASSEMBLY AND WEATHER STRIP THEREFOR
Filed March 28, 1938   2 Sheets-Sheet 1

Louis A. Macklanburg,
INVENTOR
BY Bernard P. Miller
ATTORNEY

Feb. 17, 1942. L. A. MACKLANBURG 2,273,279
WINDOW SASH ASSEMBLY AND WEATHER STRIP THEREFOR
Filed March 28, 1938 2 Sheets-Sheet 2
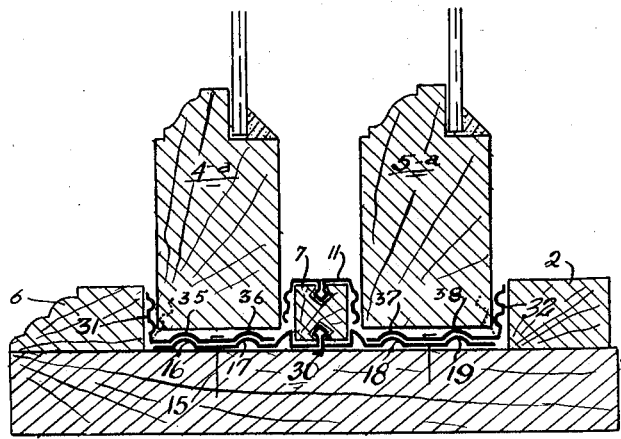
Fig. 5
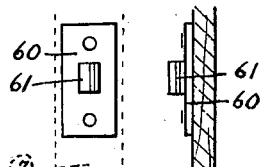
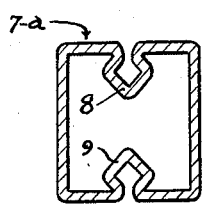
Fig. 7
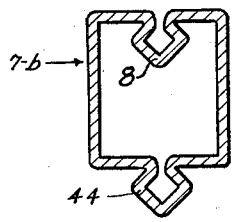
Fig. 8
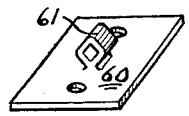
Fig. 12
Fig. 9 Fig. 15 Fig. 16 Fig. 10
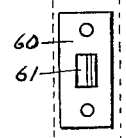 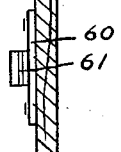
Fig. 13 Fig. 14
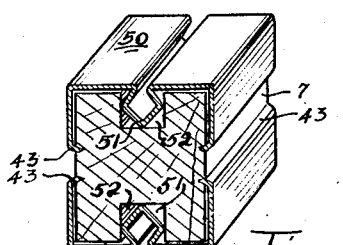
Fig. 11
Louis A. Macklanburg
INVENTOR
BY Bernard P. Miller
ATTORNEY Patented Feb. 17, 1942

2,273,279

UNITED STATES PATENT OFFICE 2,273,279

WINDOW SASH ASSEMBLY AND WEATHER STRIP THEREFOR

Louis A. Macklanburg, Oklahoma City, Okla.

Application March 28, 1938, Serial No. 198,470

5 Claims. (Cl. 20—12)

The invention relates to weather strip, and more particularly to a strip assembly for sealing between window casing and window sash slidably mounted therein.

One object of the invention is the provision of a weather strip and sash assembly which is flexible in general construction, readily lending itself to accommodate sliding window sash of various thicknesses without alteration in its construction.

At the present time window sash are made in various thicknesses, and in most instances, it is now necessary to provide weather strip of corresponding widths in order to effectively seal against entry of the elements between the sash and frame. Common practice, particularly in residential structures, has somewhat standardized these sash thicknesses, but there are, even yet, at least three sash thicknesses which are commonly used.

These thicknesses are 1⅜ inches, 1¾ inches, and 2⅛ inches. There is therefore a variation of approximately ¾ inch for which to compensate.

The present invention is so designed that sash of these thicknesses, as well as others, may be sealed at their side edges and top by use of one dimension of weather strip.

Another object of the invention is the elimination of wood to wood contact of the sash with its parting stop and frame, reducing friction and obtaining ease of sash operation.

A further object is to so mount the sash in a window frame that it is resiliently held therein, thus eliminating constriction of movement should the sash or frame swell due to absorption of moisture.

Another object of the invention is the provision of a novel means for removably connecting a parting-stop to the window frame.

Other objects of the invention include: the provision of a novel means for removably connecting a sealing strip to a parting-stop; unitization of weather strip dimensions, thus requiring a dealer to stock only one width of each strip unit of the assembly and yet be able to service the standard sash thicknesses; the accomplishment of simplicity in installation; durability; economy; and, efficiency.

Other objects of the invention will be apparent by reference to the accompanying two-sheet drawings, wherein:

Figure 5 is a similar view of the same embodiment of the assembly used for mounting narrower sash;

Figures 7 and 8 are sectional details of proposed parting stop strips;

Figures 9, 15 and 16 are sectional details of three different configurations of attaching beads or grooves therefore which may be used in the various parts of the assembly;

Figure 10 is a perspective view of a retaining element which may be used in the assembly;

Figure 11 is a perspective view of a section of parting stop depicting usage of the element shown in Fig. 10;

Figure 12 is a perspective view of a slightly different retaining element;

Figure 13 is a schematic view showing installation of the element depicted in Fig. 12; and, Figure 14 is an elevational side view of the same.

Like characters of reference designate like parts in the various figures.

Figure 1:
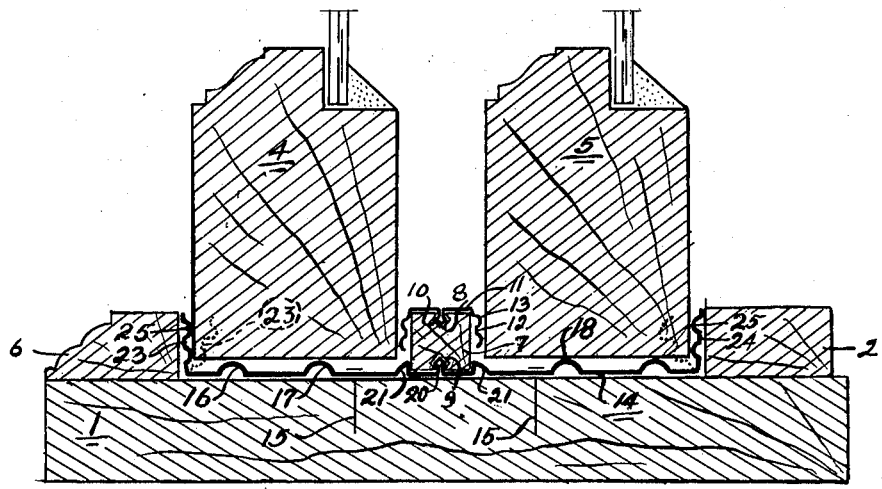
Figure 1 is a horizontal sectional view through two typical sliding window sash and a portion of a window frame in which the sash are mounted in accordance with one embodiment of the invention, the weather strip being shown more or less schematically.

Refer now to Fig. 1 of the drawings wherein the reference numeral 1 indicates as a whole a vertical side plate of a window frame having a usual blind stop or strip 2 attached firmly along its outer edge portion 3. A pair of parallel window sash 4 and 5 are slidably mounted within the frame and are movable along the adjacent face of the plate 1, their parting movement being limited by a molding strip 6. In usual window frame construction the two sash are separated by a parting stop firmly nailed to or mortised into the plate 1, however, a particular type of parting stop forms part of the present invention, the other parts thus far described being typical of common window frame construction and sash mounting practice.

In Fig. 1 a parting stop 7 is shown which is provided throughout its length on two opposite faces with grooves 8 and 9 which are preferably polygonal in cross-section. The groove 8 receives a polygonal bead or rib 10 carried by the central portion of a resilient metal sealing or crown strip 11 which covers the face of the parting stop. The strip 11 has side wings 12 bent at an angle to its body and lying along the side faces of the parting stop 7. The wings 12 are provided with longitudinally extending self-formed ribs 13 for contacting and forming a seal with the adjacent faces of the two sash 4 and 5. The wings 12 have an inherent resiliency causing them to forcibly contact the sash.

The parting stop of the present invention is not permanently attached to the frame plate 1 as in usual practice, but is removably connected thereto by a portion of a metal base or channel strip 14 lying along the plate 1. The strip 14 of the present embodiment which will now be described, also acts to seal between the plate 1 and the adjacent edges of the two sash.

The base strip 14 is formed of sheet metal and is attached to the plate 1 by usual detents 15. Spaced ribs 16, 17, 18 and 19 are formed along the body portion of the strip 14 throughout its entire length and, these ribs not only form a resilient seal against the edges of the sash, but also act as tracks along which the sash may be moved. The ribs or tracks eliminate usual wood to wood contact of the sash and the plate, and thus reduce friction to a minimum.

Centrally, the base strip 14 is provided with a projecting bead 20 extending throughout its length, and adapted to be snapped into the groove 9 in the parting stop 7 for retaining the same in place. Ribs 21 are also formed in the strip 14 at each side of the bead 20 and these last mentioned ribs form abrupt shoulders 22 for bracing the parting stop against lateral movement.

The opposite edge portions of the base strip 14 are formed into wings 23 and 24 having longitudinally extending sealing ribs for sealing respectively with the molding 6 and the sash 4 and with the sash 5 and the blind stop 2. The inherent resiliency of these wings insure positive sealing engagement with the elements between which they repose.

In considering the above described structure as a whole, it is to be understood that the plate 1, the blind stop 2, the molding 6 and the parting stop 7 extend along both sides and the top of the window opening. Also, that the base strip 14 extends along the entire inner face of the plate 1, and that the crown strip 11 extends along and covers the complete inner surface of the parting stop. The result is that both sash slide within armored channels, and that since the wing portions 12 and 23 of the strips 11 and 14 are resilient, compensation is furnished for any swelling which might be the result of the sash absorbing moisture. Since the sash are in sliding contact with only the ribs of the wing portions 12 and 23, of the strips 11 and 14, ease of movement is insured.

Attention is directed to the fact that the sash are not grooved to receive the ribs along which they slide. Attention is also directed to the fact that the parting stop is installed without use of nails or similar detents and without the use of any tools, and that it may be easily and quickly removed. Also, that the strip 11 is similarly attachable to and removable from the parting stop.

In Fig. 9 is illustrated three cross-sections of beads or grooves which may be used in detachably connecting the parting stop to the strips 11 and 14.

Figure 2:
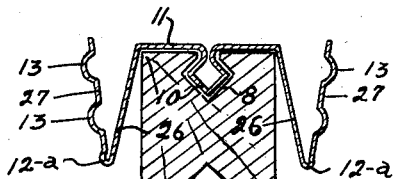
Figure 2 is an enlarged sectional detail of an alternative weather strip used in connection with the invention.
Figure 3:
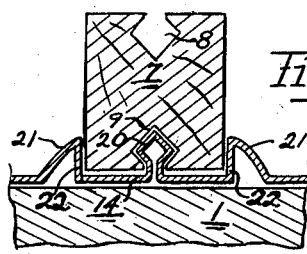
Figure 3 is an enlarged detail of a portion of the embodiment shown in Fig. 1.

In Fig. 2 is shown a crown strip 11 having wing portions 12—a of a slightly different configuration than the wings 12 of Fig. 1. In this embodiment the wings each consist of smooth portion 26 and a ribbed portion 27 integral therewith and lying at an acute angle with relation thereto. The portion 27 carries the ribs 13 which bear against the two sash.

Figure 4:
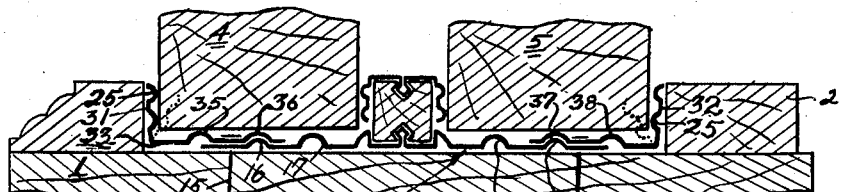
Figure 4 is a view similar to Fig. 1, showing a slightly different embodiment of the assembly.

Refer now particularly to Figs. 4 and 5 wherein is shown an embodiment of base strip which may be used in lieu of the base strip 14 in order to accommodate sash of different thicknesses. In this embodiment a base strip 30 is provided which is identical with the strip 14 except that its edge portion, including the wings 23 and 24 are absent therefrom. In this embodiment the strip 30 is equipped with the previously described ribs 16, 17, 18 and 19. Wings 31 and 32 are provided in lieu of the previously described wing portions 23 and 24 respectively of the base strip 14, and these wings bear the previously described ribs 25. However, the wings 31 and 32 have base portions 33 and 34 respectively which are equipped respectively with ribs 35—36, and 37—38, which are spaced from each other equidistantly to spacing of the ribs 16—17 and 18—19 of the base strip 30.

As illustrated in Fig. 4, the sash 4 and 5 are of a thickness requiring the base portions 33 and 34 of the wings 31 and 32 to extend outwardly past the edges of the base strip 30. The rib 36 of the base portion 33 is therefore located over the rib 16 of the strip 30, and the rib 37 of the portion 34 is telescoped over the rib 19. The detents 15 may pass through the base strip 30 and the base portions 33—34 of the wings 31—32 as shown, or through the base strip 30 only, if desired.

In Fig. 5, the same structure is shown adapted to the accommodation of sash 4—a and 5—a which are narrower than the sash 4 and 5 of Fig. 4. In this adaption, the ribs 35—36 and 37—38 are installed over ribs 16—17 and 18—19 respectively.

From the above description it may readily be seen that a sealing structure made in accordance with the disclosures of Figs. 4 and 5 will accommodate window sash of different thicknesses. Therefore, a dealer need stock only the base strip 30 and the wing element 31, since the elements 31 and 32 are interchangeable, in order to accommodate different thicknesses of sash. Any number of ribs may be provided in the elements and the rib spacing may be varied to accommodate the prevalent or most common thicknesses of sash.

Figure 6:
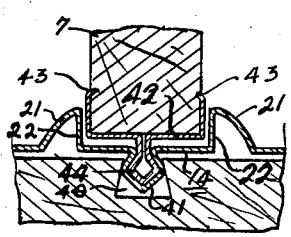
Figure 6 is a view similar to Fig. 3 but showing an alternative.

In Fig. 6 is shown a mode of construction wherein the base strip 14, is connected to the plate 1 without use of the detents 15. In this embodiment the plate 1 has a central longitudinally extending groove 40, and the base strip 14 has a projecting bead 41 which snaps therein to hold the base strip in place. The adjacent face of the parting stop 7 has a retaining plate 42 attached therealong by crimping its edges 43 into the side surfaces of the stop. The retaining plate 42 is equipped with a projecting bead 44 which snaps into the head 41 of the base strip 14. Since no weather-proof seal is necessary between the parting stop 7 and the base strip 14, it may be found desirable for the sake of economy to make the retaining plate 42 in short lengths and to attach these lengths spacedly along the parting stop. It is obvious that the structure disclosed in Fig. 6 may well be used with the base strip 30 of Figs. 4 and 5 should it be found desirable to so do.

In Fig. 7 is illustrated a hollow or tubular metal parting stop 7—a which may be used in lieu of the parting stop 7 which is depicted as being made of wood. In this instance the grooves 8 and 9 are rolled integrally with the body of the stop.

In Fig. 8 is shown a parting stop 7—b which is also of tubular metal and which is designed for use with the base strip embodiment shown in Fig. 6.

Reference is now made more particularly to Figs. 10 and 11 wherein is shown a metal clip 50 somewhat similar in cross-section to the retaining plate 42 of Fig. 6, but having a retaining bead 51 extending in an opposite direction to that of the bead 44 thereof. When the clips 50 are to be used, the parting stop 7 is formed with oppositely disposed longitudinally extending grooves 52 into which the beads 51 of the clips 50 extend. The clips are retained in place upon the parting stop by gripping action of the edges 43 thereof. The beads 10 and 20 respectively of the crown strip 11 and the base strip 14 are then snapped into the beads 51 of the clips 50. The clips are spaced as desired along the parting stop 7.

In Fig. 12 is illustrated a flat retaining plate 60 having a projection 61 and which may be nailed at intervals to the parting stop 7 to take the place of the retaining plates 42 of Fig. 6. Figs. 13 and 14 fully illustrate this installation.

From the hereinabove description it is thought that use, installation, and operation of the various elements of the assembly will be clear to any one versed in the weather-strip art, and that further explanation would be superfluous. It is also thought that structure has been disclosed hereinabove which will accomplish all of the purposes set forth.

Obviously, the invention is capable of embodiment in forms other than those illustrated and described herein, and is adaptable to uses and purposes other than those set forth, and I therefore do not wish to limit myself as to the scope of the invention except as I am limited by the appended claims.

I claim:

1. The combination with a window frame plate along which a pair of sash are adapted to slide, of a metal sealing strip attached to the plate and extending therealong between the plate and the sash, a parting stop between the sash provided with a longitudinally extending groove, and a projection carried by the sealing strip for complemental interlocking engagement within said groove to anchor the parting stop to the plate in a removable manner.

2. The combination with a window frame plate along which a pair of sash are adapted to slide, of a metal sealing strip attached to the plate and extending therealong between the plate and the sash, a parting stop between the sash provided with a longitudinally extending groove, and a longitudinally extending bead carried by the sealing strip for complemental interlocking engagement in said groove whereby the parting stop is removably anchored to the plate.

3. The combination with a window frame plate, a pair of window sash slidable therealong, a metal sealing strip attached to the plate and extending therealong between the plate and the sash, and a parting stop between the sash, of complemental inter-engaging and inter-locking means carried by the parting stop and the sealing strip for positioning the two with relation to each other, said means being the sole agent for anchoring the parting stop.

4. The combination with a window frame plate, a pair of window sash slidable therealong, a metal sealing strip attached to the plate and extending therealong between the plate and the sash, and a parting stop between the sash, of complemental inter-engaging and inter-locking means carried by the parting stop and the sealing strip acting as the sole means for positioning the two with relation to each other, and longitudinally corrugated side portions carried by the sealing strip for sealing between the outer faces of the two sash and the inner faces of two usual sash confining strips attached along the plate.

5. In a weather strip assembly, the combination with a window frame plate, a pair of window sash slidable therealong, and a pair of confining strips attached to the plate between which the sash is adapted to slide, of a combination weather strip and parting stop structure including: a weather strip consisting of a body portion of resilient sheet metal extending along and attached to the plate; spaced longitudinally extending ribs carried by the body portion for sealing engagement with the adjacent edges of the two sash; resilient off-set portions at each side of the base portion and lying along the opposite outside faces of the two sash; spaced longitudinally extending ribs carried by the two off-set portions for sealing between said faces and the adjacent faces of the sash confining strips; a projection carried by the body portion of said strip and lying between the sash; and a parting stop lying between the two sash and having a longitudinally extending groove for mating engagement with said projection for maintaining the parting stop in place.

LOUIS A. MACKLANBURG.